United States Patent

[11] 3,587,434

| [72] | Inventor | Wolfgang Ort<br>Stuttgart-Bad, Cannstatt, Germany |
|---|---|---|
| [21] | Appl. No. | 747,590 |
| [22] | Filed | July 25, 1968 |
| [45] | Patented | June 28, 1971 |
| [73] | Assignee | Eastman Kodak Company<br>Rochester, N.Y. |
| [32] | Priority | Aug. 5, 1967 |
| [33] | | Germany |
| [31] | | K63-047 |

[54] SHUTTER FOR PHOTOGRAPHIC CAMERA
6 Claims, 3 Drawing Figs.

[52] U.S. Cl. .................................................. 95/59
[51] Int. Cl. .................................................. G03b 9/16
[50] Field of Search ........................................ 95/58, 59, 60

[56] References Cited
UNITED STATES PATENTS
3,033,092  5/1962  Ernisse et al. .................. 95/59

| 3,208,365 | 9/1965 | Cooper et al. ................ | 95/60 |
| 3,362,309 | 1/1968 | Cooper et al. ................ | 95/53X |
| 3,430,547 | 3/1969 | Norton ......................... | 95/60 |

*Primary Examiner*—John M. Horan
*Assistant Examiner*—Michael Harris
*Attorneys*—Robert W. Hampton and Ronald S. Kareken ABSTRACT: A shutter mechanism for a photographic camera includes a pivotable impact shutter blade and an inertial mass pivotally mounted on the shutter blade for movement therewith and for pivotal movement relative thereto. For fast shutter speeds both the shutter blade and the inertial mass move a certain distance limited by a stop to open the aperture and then return by a spring bias to their closing positions. For a slow shutter speed the shutter blade opens the same limited distance but the inertial mass is permitted to continue its movement about its pivot connection to the shutter blade, holding the shutter blade open until the inertial mass is returned to its closed position by the spring bias.

WOLFGANG ORT
INVENTOR

SHUTTER FOR PHOTOGRAPHIC CAMERA

BACKGROUND OF THE INVENTION

1. Field of the Invention

This invention relates to photographic cameras and more particularly to an adjustable shutter mechanism for a photographic camera.

2. Description of the Prior Art

In known adjustable speed shutters of the impact type, different shutter speeds are provided either by variable tensioning of a driving spring or by a variable positioning of a stop member engaging the shutter blade to reverse its direction of travel. However, these known shutters have disadvantages which considerably reduce their practical applications.

First, these known shutters require too much space since for the longer exposure times the blade must swing out to a greater extent. Secondly, the speed range achieved by a not too complicated structure is unsatisfactory. In general this range is limited to between one one-hundredth and one-fortieth second. However, even simple shutters should have a short exposure time of about one one-fiftieth sec. for daylight exposures and a longer exposure time of about one-thirtieth sec. for flash exposures, that is, a speed range factor of 1:5.

To increase the speed range accordingly, it has already been proposed to provide a photographic shutter in which the shutter blade is coupled with an inertia member resiliently arranged parallel to a longitudinal edge of the shutter blade, which edge is not directly concerned with uncovering and covering the exposure aperture. In this known arrangement, the inertia member is capable of resiliently swinging out to any desired extent, thereby using up to the kinetic energy of the swing movement as long as the blade is retained by a stop in its open position. However, since in this arrangement the shutter blade is opened first, after which the time-delaying inertia member is caused to swing out, the size of this shutter also is relatively large.

SUMMARY OF THE INVENTION

The present invention, which overcomes the disadvantages of known shutter mechanisms, comprises a simple shutter of the aforementioned type with an inertia member mounted on the impact shutter blade for movement with and relative to the shutter blade.

According to a preferred embodiment of the present invention, an inertia member is designed as an inertia plate pivotally mounted on the shutter blade. In order to minimize space required for swing-out motion of the inertia member, the pivot of said inertia member on the shutter blade is located between the pivot of the shutter blade and the exposure aperture. Further, the shutter is constructed such that, in its closed position, the shutter blade covers part of the exposure aperture, while the remaining area of the exposure aperture is covered by the inertia member.

BRIEF DESCRIPTION OF THE DRAWING

Objects and the attendant advantages of the present invention will become apparent from the detailed description of the preferred embodiment to follow, the accompanying drawings forming a part thereof and wherein.

DESCRIPTION OF THE PREFERRED EMBODIMENT

Because photographic cameras are well known, the present description will be limited to those elements forming part of or cooperating directly with the present invention, the elements of a camera not shown or described herein being understood to be selected from those known in the art.

Figure 1:
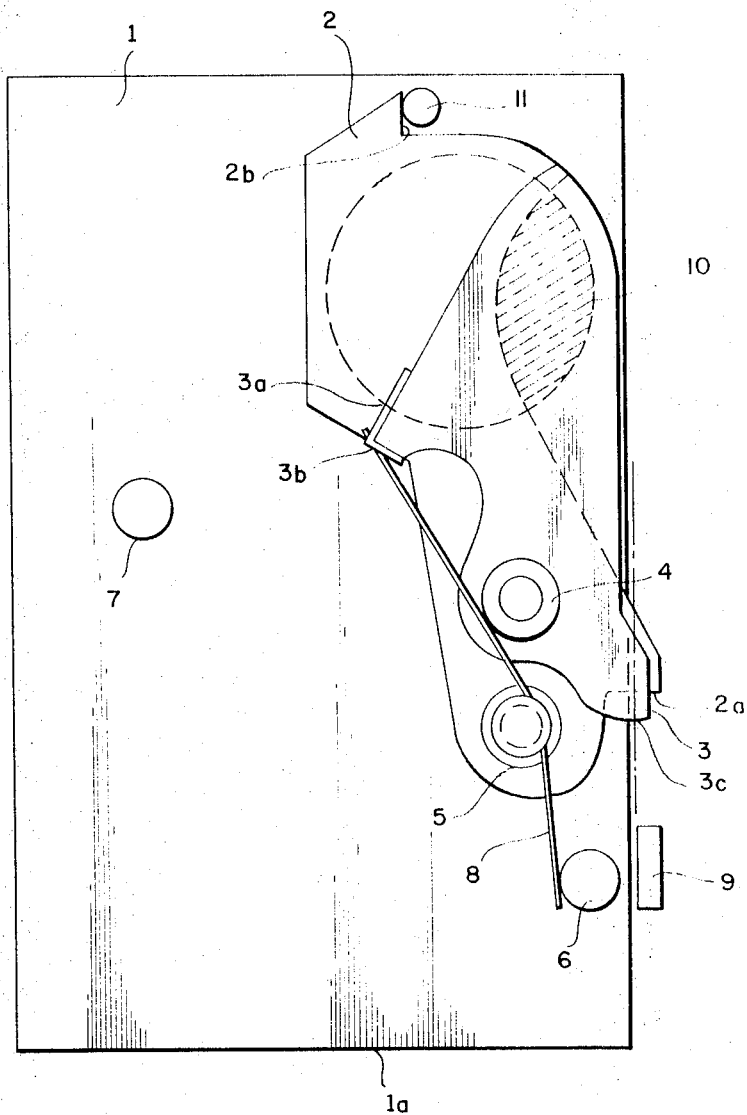
FIG. 1 shows schematically a shutter mechanism constructed in accordance with the present invention, with the elements shown in the cocked position and set for a short exposure time.

Referring now to the drawings, there is provided a base plate 1 having a shutter blade 2 pivoted thereon at point 5. A projection 2a on blade 2 extends into the path of a striking arm 9 of an actuating member operated in a known manner by a spring force upon the release of the shutter lever to take the picture. Secured to the shutter blade 2 at a pivot 4 is an inertial member 3. In addition to its function of controlling movement of the shutter blade 2, inertial member 3 covers a portion of the exposure aperture 10 in the closed position, which portion is shaded as illustrated in FIG. 1. Consequently, in the closed position light is prevented from entering the aperture by both the shutter blade 2 and the inertial member 3, as a result of which the size of the shutter blade 2 and the overall size of the shutter mechanism can be reduced.

In the rest or shutter closed position of the elements as shown in FIG. 1, the inertial member 3 includes a projection 3c also extending into the path of striking arm 9. When the shutter lever (not shown) is released, the striking arm 9 moves along the dash-dotted line (upward as shown in the drawings) first striking the projection 2c of the inertial mass 3 and immediately thereafter striking the projection 2 2a of the shutter blade 2. This impart causes the shutter to open as the shutter blade 2 and the inertial member 3 commence their counterclockwise movement, as shown to uncover the aperture 10.

The inertial member 3 includes two rectangularly bent portions 3a and 3b. Portion 3b engages an edge of shutter blade 2 during the closing process and while the shutter is closed. One arm of a shutter return spring 8, mounted on pivot 5, engages a fixed abutment 6 while the other arm of spring 8 engages portion 3a of the inertial member 3 to urge the same towards the closing position. Thus, spring 8, acting through portion 3a, member 3 and portion 3b, acts upon the shutter blade 2 to also urge the blade to the closed position.

Figure 2:
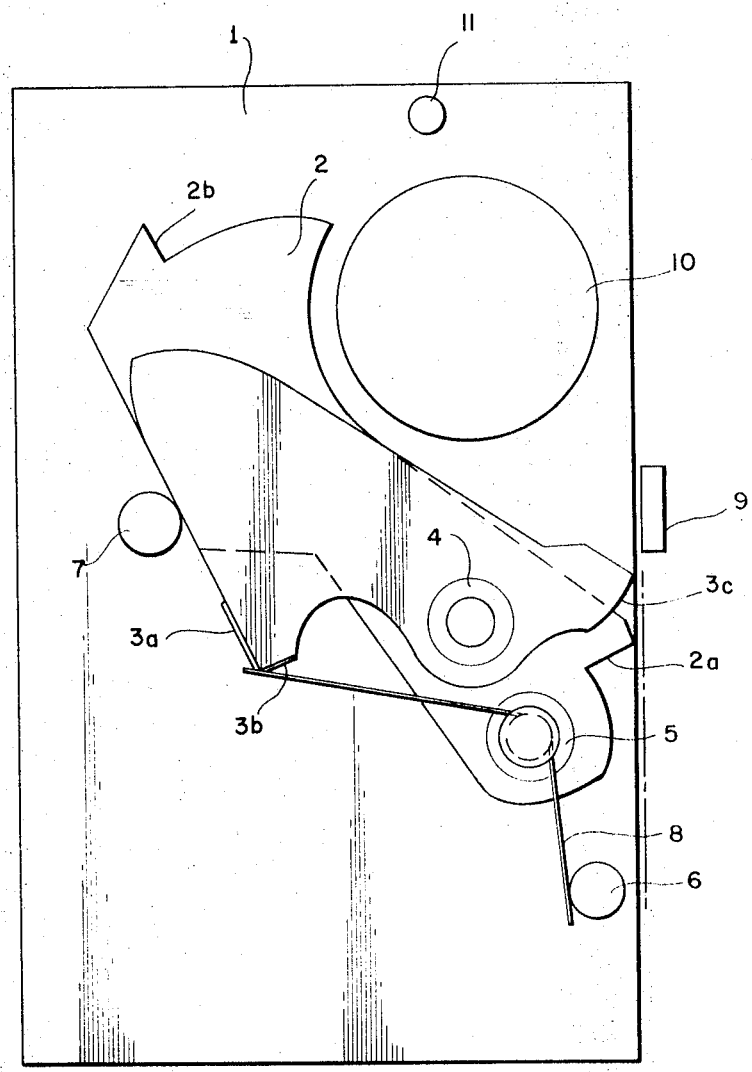
FIG. 2 is a schematic view similar to FIG. 1 but showing the elements during exposure.
Figure 3:
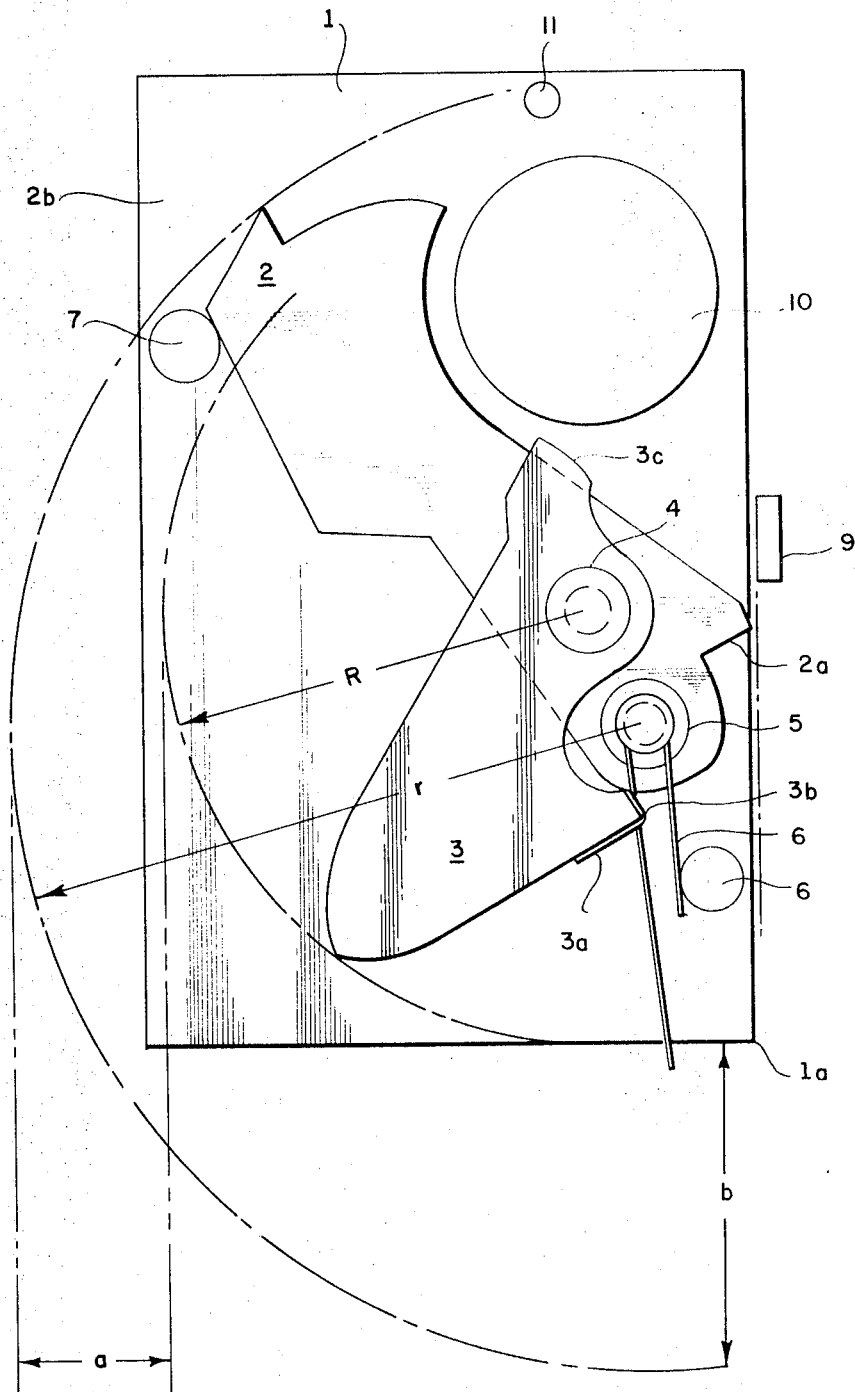
FIG. 3 is a schematic view similar to FIGS. 1 and 2 but showing the elements in the uncocked or open aperture position when the shutter mechanism is set for a longer exposure time.

The exposure time is determined by the position of a stop member 7 set in a manner known per se. In FIGS. 1 and 2, this stop member is set for a fast shutter speed while FIG. 3 shows this stop member positioned for a slower shutter speed. With the stop member 7 in the position as shown in FIGS. 1 and 2, both the shutter blade 2 and the inertial member 3 strike the stop member 7 simultaneously to terminate counterclockwise rotation. The result of blade 2 and member 3 striking stop member 7 simultaneously is possible because the two projections 2a and 3c are arranged in the path of striking member 9 so that the striking member first engages projection 3c and subsequently engages projection 2a.

Thereafter, shutter return spring 8 causes the blade and inertial members to return to closed aperture position of FIG. 1. As the elements 2 and 3 move to the open aperture position, the bent portion 3a compresses the spring 8, storing energy in the latter, which energy is applied to the elements 2 and 3 to assist the closing movement of these elements after their direction of travel has been reversed. This assures complete movement of the elements 2 and 3 to the closed aperture rest position, at which a projection 2b engages a fixed terminal stop 11 and the two projections 2a and 3c are in the path of movement of striking arm 9.

To avoid rebounding effects as the shutter is being closed, it is desirable to design closing spring 8 such that it may continue to exert a force on the inertial member 3 to cause member 3 to reach its initial or rest position after the projection 2b on the shutter blade has reached the fixed stop member 11. Thus, the final closing movement of the inertial member 3 prevents projection 2b from rebounding from the stop member 11.

To produce a longer exposure time, the stop member 7 is moved to the position shown in FIG. 3 outside of the path of motion of inertial member 3. In this position, the operation of the shutter mechanism is as follows. After shutter release striking arm 9 has been moved through its predetermined path and transmitted its kinetic energy to both the inertial member 3 and the shutter blade 2, these two elements 2 and 3 commence their counterclockwise movement to uncover the aperture 10. After having completely uncovered this aperture, the shutter blade 2 abuts the stop member 7. However, the inertial member 3 bypasses stop member and continues to move counterclockwise about its pivotal connection with the shutter blade 2. This additional counterclockwise movement of inertial member 3 prevents return movement of the shutter blade 2 upon the engagement of the latter with stop member 7.

When the inertial member 3 reaches a point, at which sufficient energy in the closing spring 8 has been stored, spring 8 reverses the direction of movement of the inertial member 3 about the pivot connection 4 on shutter blade 2. The inertial member 3 continues its clockwise closing movement until the bent portion 3b engages an edge on the shutter blade 2, after which both elements move to the closed aperture rest position in the same manner as when the stop member 7 is in the fast shutter speed position.

Referring to FIG. 3, it can be seen that the radius of motion R of initial member 3 is substantially less than the radius of motion r of the shutter blade 2. Consequently, when the elements are set for a longer exposure time, a much smaller overall space is required to house the elements 2 and 3 then would be the case if a single piece shutter blade were required to swing through a large arc. The arrows a and b in FIG. 3 illustrate the additional width and length that would be required for the base plate 1 if a single piece shutter blade were used.

Because of the relatively small path of motion of the inertial member 3, this member can rotate approximately 180 degrees without extending beyond the area of base plate 1, as shown. Consequently, a speed range factor of about 1:5 easily is achieved.

The invention has been described in detail with particular reference to preferred embodiments thereof, but it will be understood that variations and modifications can be effected within the spirit and scope of the invention as described hereinabove and as defined in the appended claims. For example, while the shutter blade and inertial member are shown as planar elements, it is apparent that they may comprise other shapes such as cylindrical sectors. Also, the elements may be incorporated in cylindrical shutter housings.

I claim:

1. A shutter mechanism for covering and uncovering an exposure aperture in a photographic camera, said shutter mechanism comprising:
   a shutter blade mounted for movement between a closed position in which it covers a portion of the aperture and an open position in which it uncovers said portion of the aperture;
   actuating means for causing movement of the shutter blade from said closed position to said open position; and
   an inertial member having a rest position in which it covers the remaining portion of the aperture when the shutter blade is in its said closed position, said member being mounted on the shutter blade for movement with and relative to the shutter blade away from said rest position under the influence of said actuating means.

2. The mechanism claimed in claim 1 wherein said shutter blade is mounted for pivotal movement about an axis between said closed and open positions and wherein said inertial member is pivotably connected to said shutter blade.

3. The mechanism claimed in Claim 1, further comprising resilient mean biasing said inertial member towards said rest position, said inertial member including means engageable with said shutter blade to cause the resilient means to act through said inertial member to bias the shutter blade to its closed position.

4. A shutter mechanism for covering and uncovering an exposure aperture in a photographic camera, said shutter mechanism comprising:
   a shutter mechanism for covering and uncovering an exposure aperture in a photographic camera, said shutter mechanism comprising:
   a shutter blade mounted for movement between a closed position in which it covers a portion of the aperture and an open position in which it uncovers said portion of the aperture;
   actuating means for causing movement of the shutter blade from said closed position to said open position;
   an inertial member mounted on the shutter blade for movement with and relative to the shutter blade away from a rest position under the influence of said actuating means;
   means for biasing said inertial member toward its rest position;
   an adjustable stop member movable to a first position at which it limits the movement of both the shutter blade and said inertial member, and to a second position at which it limits movement of the shutter blade and permits said inertial member to continue moving away from the rest position until reversed by said biasing means.

5. The mechanism claimed in claim 4 wherein said shutter blade and said inertial member each include a projection separately engaged by the actuating means for movement away from the closed position and the rest position respectively.

6. The mechanism claimed in claim 5 wherein said actuating means first engages the inertial member projection and subsequently engages the shutter blade projection.